Feb. 27, 1945. E. F. HOHWART 2,370,351
CLAMPING FIXTURE
Original Filed March 19, 1943 3 Sheets-Sheet 1
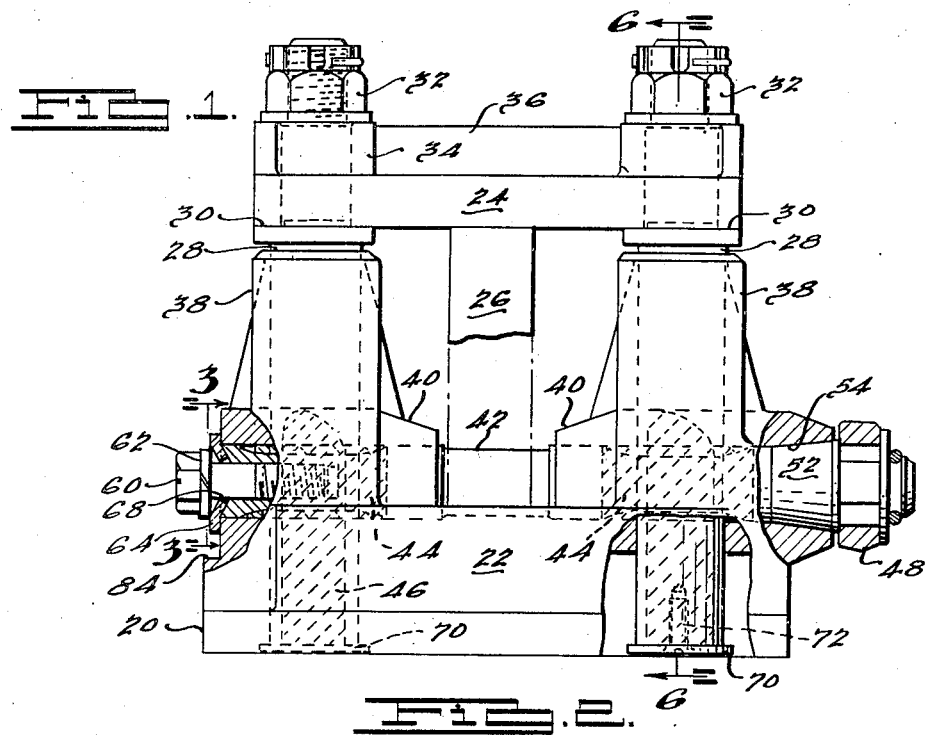
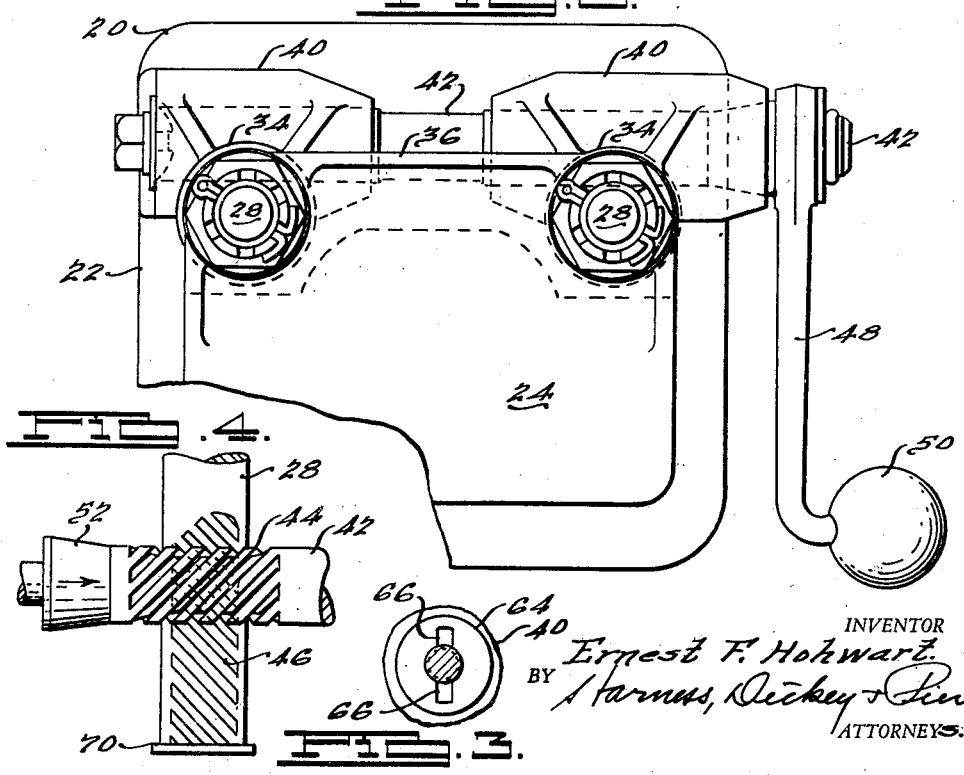
INVENTOR
Ernest F. Hohwart.
BY Barnes, Dickey & Pierce
ATTORNEYS.

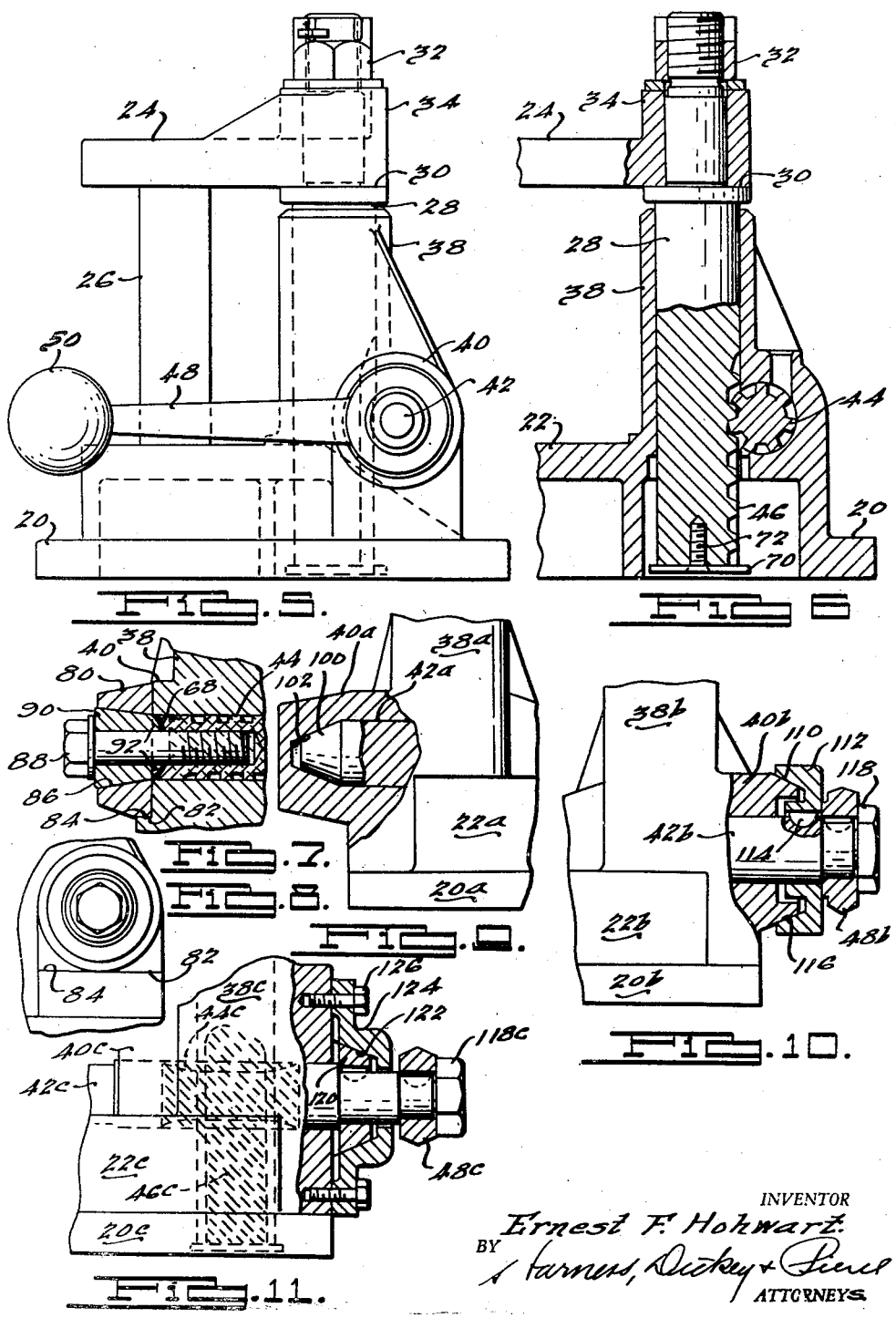

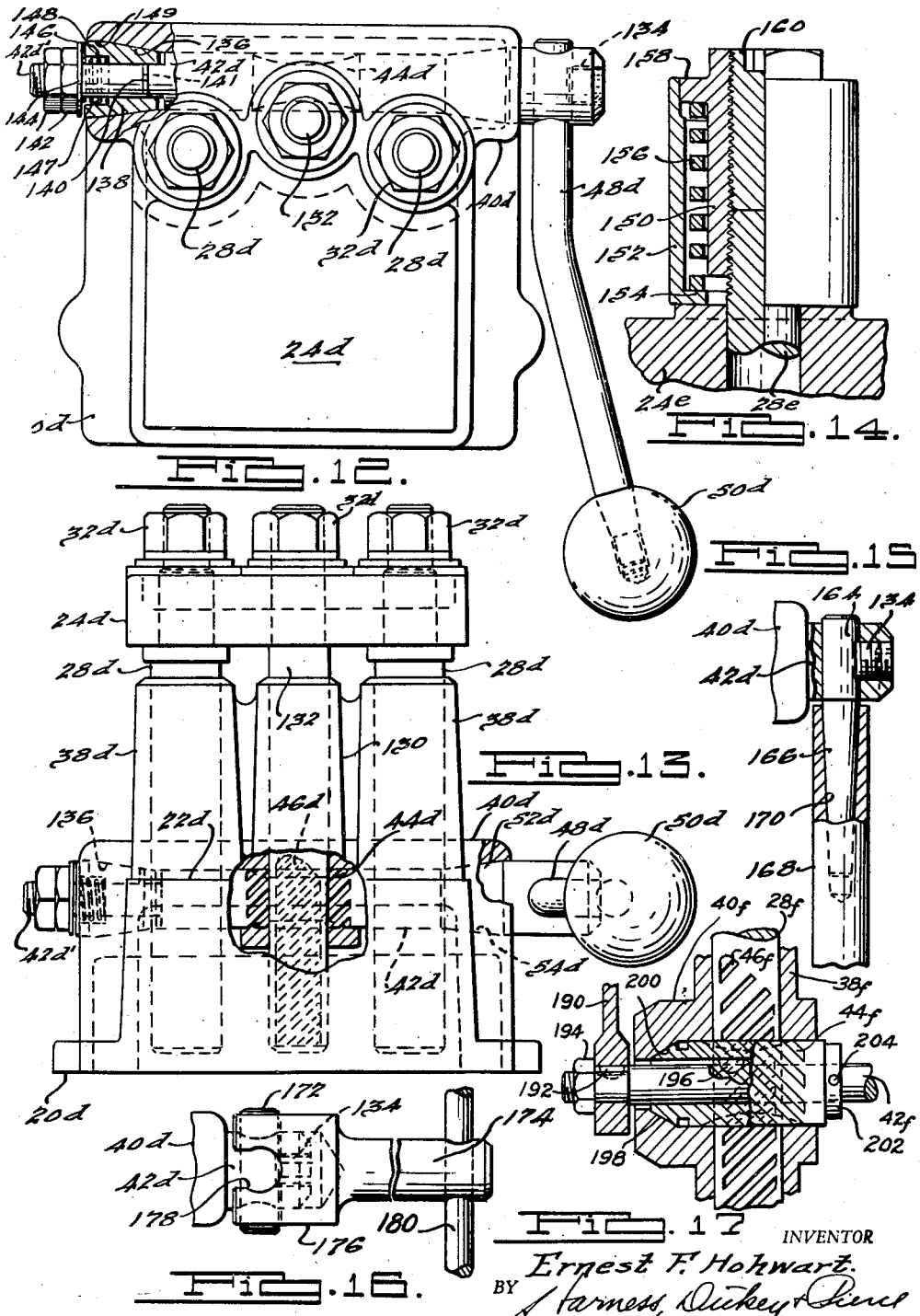

Patented Feb. 27, 1945

2,370,351

UNITED STATES PATENT OFFICE 2,370,351

CLAMPING FIXTURE

Ernest F. Hohwart, Detroit, Mich., assignor to N. A. Woodworth Company, Ferndale, Mich., a corporation of Michigan Continuation of application Serial No. 479,714, March 19, 1943. This application April 28, 1943, Serial No. 484,859

10 Claims. (Cl. 192—8)

This invention relates to clamping fixtures and particularly to that type thereof employed in releasably securing a piece of work in place during a machining operation thereon, the principal object being the provision of a device of this type that is simple in construction, efficient in operation, and economical to manufacture. It is a continuation of my application for Letters Patent of the United States on the same subject filed March 19, 1943, Serial No. 479,714.

Objects of the invention include the provision of a clamping fixture including a pair of relatively movable parts together with means for moving the parts toward and from one another and automatically operable to lock the parts against inadvertent retractable movement when the desired clamping pressure is applied to the piece of work confined between them; the provision of a structure as above described in which the locking means comprises a pair of parts having surface engagement with respect to each other; the provision of a structure as above described in which such surface engagement is of a relatively great extent as compared to structures heretofore proposed; the provision of a structure as above described in which such surface engagement is of a relatively great extent as compared to structures heretofore proposed; the provision of a structure as above described in which the relatively movable parts are automatically locked against inadvertent movement both when in clamping relation with respect to each other and when separated from each other to receive a piece of work between them; and the provision of a device of the type described so constructed and arranged as to lock the relatively movable parts against inadvertent movement in at least one direction upon the application of pressure in the direction of movement thereof, that is of extremely simple, durable and economical construction involving a minimum of parts.

Other objects of the invention include the provision of a clamping fixture comprising a base and a clamping member relatively movable with respect thereto, a post extending between the base and the clamping member and having rack teeth formed thereon, a shaft part rotatably mounted in the base and having a pinion part thereon arranged in meshing relationship with respect to the rack teeth on the post, the shaft part being rotatable whereby to act through the pinion part and the rack teeth to cause the clamping member to approach toward or recede from the base, a handle or wrench part to turn the shaft, one of said parts being axially shiftable and provided with a friction surface thereon arranged for frictional engagement with a complementary surface of said base upon said axial shifting thereof in one direction, the connection between said wrench part and said post including cooperating force transmitting surfaces inclined with respect to the direction of force exerted therebetween whereby to be effective to urge the axially shiftable part axially thereof upon the transmission of such force between them to effect frictional engagement of said frictional surfaces, thereby to lock said clamping member against inadvertent movement with respect to said base; the provision of a construction as above described in which the shaft part and the pinion part are fixed with respect to each other and the pinion is provided with helical teeth cooperating with complementary formed teeth on the post constituting the inclined surfaces urging the shaft part and the pinion part axially during a clamping operation; the provision of a construction as first above mentioned in which the pinion part is axially shiftable upon the shaft part; the provision of a construction as last described in which the pinion part is provided with helical teeth lying in meshing relationship with complementary teeth formed on the post whereby the pinion is urged axially under the force of a clamping operation; and the provision of any one of the structures above described in which the frictional surfaces providing the clamping effect between the base and one of the parts are conical surfaces.

Further objects of the invention include the provision of a clamping fixture as above described in which the clamping member is frictionally locked against movement in either direction upon the presence of a force tending to restrict its movement in such direction; the provision of a construction as above described in which the operating shaft may be inserted from either end of the opening provided therefor in the base whereby it may be employed either as a right-hand or a left-hand fixture; the provision of a construction as above described in which a yielding connection is provided between the operating post and the clamping member; and the provision of a construction as above described in which movement of the clamping member with respect to the base is guided independently of the means for effecting movement between the clamping member and the base.

The above being among the objects of the present invention the same consists in certain novel features of construction and combinations of parts to be hereinafter described with reference to the accompanying drawings, and then claimed, having the above and other objects in view.

In the accompanying drawings which illustrate suitable embodiments of the present invention and in which like numerals refer to like parts throughout the several different views, Fig. 1 is a partially broken, partially sectioned front elevational view of a two-post clamping fixture constructed in accordance with the present invention;

Fig. 2 is a partially broken plan view of the clamping fixture shown in Fig. 1;

Fig. 3 is a transverse sectional view taken on the line 3—3 of Fig. 1;

Fig. 4 is a fragmentary elevational view taken from the opposite side of the fixture from the view shown in Fig. 1 and illustrating the cooperating portions of one of the posts and the associated portion of the operating shaft to better illustrate the arrangement of the cooperating gear teeth thereon;

Fig. 5 is an end elevational view of the clamping fixture shown in the preceding views;

Fig. 6 is a transverse sectional view taken on the line 6—6 of Fig. 1;

Fig. 7 is a fragmentary, sectional view taken centrally through the operating shaft of a modified form of construction in which the cone locking elements are formed at the opposite end of the operating shaft from that illustrated in the preceding figures;

Fig. 8 is an end elevational view of the construction shown in Fig. 7, taken from the left-hand end thereof;

Fig. 9 is a view similar to Fig. 7 but illustrating a modified form of locking cone arrangement at the same end of the operating shaft;

Fig. 10 is a fragmentary, partially broken, partially sectioned view illustrating a modified form of construction of the inter-engaging cone locking surfaces at the same end of the shaft as such surfaces are located in Fig. 1;

Fig. 11 is a view similar to Fig. 10 but illustrating a further modified form of construction for the cooperating cone locking surfaces;

Fig. 12 is a partially broken, partially sectioned plan view similar to Fig. 2 illustrating another modified form of construction;

Fig. 13 is a partially broken, partially sectioned front elevational view of the construction shown in Fig. 12;

Fig. 14 is a fragmentary partially broken, partially sectioned elevational view illustrating a modified form of connection between the posts and the clamping plate where it is desired to introduce yieldability into such connection;

Figs. 15 and 16 are fragmentary, partially broken, partially sectioned views illustrating modified forms of handle or wrench construction for the operating shaft; and Fig. 17 is a fragmentary, vertical, sectional view illustrating a modified clamping structure in which the pinion is movable axially of the operating shaft and the operating shaft is held against axial movement.

The present invention relates to that class of devices commonly known in shop practice as clamping fixtures and which are employed in machine shops and the like to clamp a piece of work therein for the purpose of holding and locating such work during a machining operation thereon. It further relates to that type of such clamping fixtures as are provided with means for automatically locking the two parts thereof between which the work is clamped against inadvertent separation from one another when a suitable clamping force has been applied to the work positioned between them.

Such clamping fixtures conventionally comprise a base in which one or more posts are axially slidably received, such post or posts carrying a clamping member or a plate thereon and which plate member is thereby movable toward and from the base in order to clamp a piece of work between it and the base. In order to effect movement between the clamping plate and the base it is conventional practice to form the post or posts with rack teeth thereon and to provide a shaft rotatably mounted in the base at right angles to the post and to provide such shaft with gear teeth thereon in mesh with the rack or racks on the post or posts so that by rotating the shaft the post or posts and consequently the clamping plate may be moved toward or from clamping position with respect to the base.

It is desirable to provide means in conjunction with such clamping fixtures so that when the shaft is operated to clamp a piece of work between the plate and the base and a sufficient amount of clamping force has been exerted on the work to hold it tightly in place for the purpose of the subsequent machining operation thereon, the shaft will be automatically locked against inadvertent reversal of movement so that such clamping force is maintained until it is desired to release the work. In the past the forms of construction employed for so locking the shaft against rotation have been more or less in the form of conventional one-way or over-running clutches and so constructed and arranged that a reversal of the turning force applied on the shaft to clamp the work in the fixture will release the clutch and permit the shaft to be rotated in a reverse direction in order to release the piece of work from the fixture. The form of locking means heretofore provided has been such, because of the use of balls or rollers as wedging means between a pair of relatively movable surfaces, that when a large number of parts of substantially the same size are clamped one after the other in the same fixture, the wedging means are repeatedly clamped between the relatively movable parts at substantially the same location in each case and eventually become imbedded or form a depression at the point of maximum pressure, an occurrence commonly known as "Brinelling" in the industry, with the result that such wedging means become ineffective or at least inefficient at such location and replacement or repair of the locking means, therefore, becomes necessary. Additionally, the form of locking means heretofore employed has usually required the use of a number of separately formed parts each requiring a relatively high degree of accuracy in their manufacture and, therefore, requiring a material amount of expense in providing them.

The present invention provides a construction wherein all of the advantages of the prior art clamping fixtures including the self-locking features thereof are provided while eliminating the disadvantageous features thereof, materially reducing the cost of the same and the locking feature of which is of extremely simple construction which eliminates to a great extent the high degree of accuracy in manufacture necessary in prior constructions. Furthermore, instead of providing point or line contact between the relatively movable parts of the locking device, surface contact is provided so that the possibility of reducing the efficiency of the locking device through "Brinelling" of the lock elements is definitely avoided. The present invention, therefore, provides a structure which is at least as effective as the prior art structures, is considerably more economical to build, has almost unlimited life, and is extremely simple in construction and involves a minimum number of parts.

The above advantages are obtained in accordance with the present invention in an extremely simple manner by so forming the teeth of the pinion and the rack on the post that the application of a clamping force between the pinion and the rack will shift the pinion axially to draw a pair of frictional locking surfaces into frictional locking engagement with each other. This effect is obtained in a simple manner by employing a pinion with helical teeth and employing complementary rack teeth on the post which automatically provides a construction in which the engaging surfaces between the pinion and the post are inclined with respect to the direction of the force transmitted through them and consequently tends to axially shift the pinion from its normal position whenever a material force is transmitted between the pinion and the rack on the post tending to move the post against resistance. The pinion is, of course mounted for a limited amount of axial movement in the base and is provided with an associated friction surface for frictional locking engagement with a complementary surface formed on the base. As previously stated, such friction surface is preferably in the form of a conical or frusto-conical surface and in this case concentric with the axis of rotation of the pinion. Thus whenever the operating shaft is turned to effect the clamping of a piece of work between the clamping plate and the base, the application of a turning force on the shaft to effect the desired clamping pressure automatically draws the two conical surfaces into frictional and binding engagement with respect to each other which thereafter maintains the shaft against inadvertent rotation in the opposite direction. A turning force applied to the shaft in a direction opposite to that required to clamp a piece of work between the clamping plate and the base will, likewise, because of the angular relation of the interengaging teeth of the pinion and rack relative to the axis of the pinion, immediately tend to separate the conical surfaces and thereby free the shaft and permit it to be rotated in a reverse direction without substantial resistance. It will, therefore, be appreciated that by this simple expedient a highly efficient and extremely economical self-locking feature is provided in such clamping fixture.

Referring now to the accompanying drawings and particularly to Figs. 1 to 6 inclusive, in which one form of the last-described type of construction is shown, it will be seen to include a base 20 provided with a raised central portion 22 providing a work-receiving portion or table. Located vertically above the base 20 and table 22 is a so-called clamping plate 24 vertically movable toward and from the table portion 22 in order to enable a piece of work, here indicated more or less diagrammatically at 26 between them. It will be understood that in actual practice these clamping fixtures are employed to hold a large number of parts, one after the other, for some machining operation thereon and that the table 22 and the plate 24 may have their opposed faces of suitable configuration for interengagement with a workpiece so as to locate the workpiece in a predetermined relation with respect thereto and further that the plate member 24 may, for instance, be provided with suitable drill bushings (not shown) therein for locating a drill or the like which is to operate upon the work at a predetermined position on the work thus located in the clamping fixture. Matters of this character are well understood by those skilled in the art and require no further explanation.

In order to connect the clamping plate 24 with the base 20 such clamping fixtures conventionally employ one or more posts extending between them, fixed to one, usually the plate 24, and slidably received by the other, usually the base 20. Most of such fixtures employ two of such posts and, accordingly, two such posts 28 are illustrated in the fixtures shown in the accompanying drawings, which posts are shouldered as at 30 for engagement with the bottom face of the plate 24 and project upwardly therethrough and above the clamping plate are provided with nuts 32 threaded thereon and which serve as means for rigidly clamping the plate 24 in engagement with the shoulders 30. The clamping plate 24 is preferably provided with a boss such as 34 around the upper end of each post 28 and a web 36 interconnecting the bosses so as to render the clamping plate 24 as rigid as possible. The base 20 is provided with a pair of upstanding bosses 38 in which the lower portions of the posts 28 are vertically slidably received, the bosses 38 preferably being of a material height so as to provide an ample bearing surface for the posts 28 in their sliding movement therein.

The base 20 is provided with a pair of horizontally-directed aligned bearing bosses 40 formed integrally therewith, each centrally disposed transversely with respect to the corresponding one of the bosses 38 and axially offset from such bosses as indicated. A shaft 42 extends between and projects through both of the bearing bosses 40 and is rotatably received therein. The shaft 42 has rigidly fixed thereto, and preferably formed integrally therewith as shown, a pair of pinions 44 each of which is centrally disposed transversely with respect to a corresponding one of the posts 28. Each post 28 is formed to provide on that face thereof opposed to the corresponding of such pinions a rack 46 the teeth of which lie in meshing relationship with respect to the corresponding of such pinions 44, so that basically the structure as thus far described is similar to the prior art constructions in that rotation of the shaft 42 acting through the pinions 44 and racks 46 acts to raise or lower the post 28, depending upon the direction of rotation of the shaft 42, and consequently cause the clamping plate 36 to approach toward or recede from the upper face of the table portion 22 of the base 20. Any suitable means may be provided for turning the shaft 42, the particular means shown in the drawings by way of illustration comprising a wrench or lever 48 nonrotatably secured to one outwardly projecting end of the shaft 42 and terminating at its outer free end in an outwardly offset ball 50 capable of being readily grasped by a workman and operated to effect rotation of the shaft 42.

In accordance with the present invention and where the type of construction shown in Figs. 1 to 13 is employed, then, as best brought out in Fig. 4, at least one of the pinions 44 and its corresponding rack 46, instead of being of the straight spur-gear type as is employed in prior art devices of this character, is of a helical gear type. As will hereinafter be more apparent, while the principles of the present invention may be realized in a multi-post clamping fixture by utilizing only one such spiral pinion between the operating shaft and one post only, and employing straight spur gears between the operating shaft and the remaining posts, it is preferable that all of the pinions be of the helical type and such structure is shown by way of illustration. Where more than one helical pinion is employed and all are rigidly fixed to the operating shaft, it will be appreciated from the following description that all of the pinions must be of the same hand when located on the same sides of the posts; that is, the teeth of all of them should turn in the same direction about the axis of the operating shaft and all are preferably spiraled in the same degree about the axis of the operating shaft. The amount of spiral, that is the degree to which the teeth are spiraled, measured by a line tangent to the pitch line of the teeth and its relation to the axis of the shaft may vary to a greater or lesser degree, depending upon the type and character of the friction surfaces employed in conjunction therewith as will be readily appreciated. In other words, any suitable angle may be employed as long as it is sufficient to provide the necessary axial force on the operating shaft during a clamping operation as will hereinafter be more fully explained, and is more or less interrelated with the angularity of the coned surfaces where employed as the friction surfaces as will hereinafter be more apparent. However, it may be stated that an angularity of the teeth of the pinions 44 of approximately 45 degrees to the axis of the shaft has proven satisfactory in service where coned friction surfaces of the type shown are employed in conjunction therewith.

Referring now to Fig. 4 which particularly brings out the inter-engagement of the teeth of one of the pinions 44 on the operating shaft 42 with the teeth of the rack 46 on the corresponding post 28, it will be appreciated that as the shaft 42 is turned to lower the post 28 and consequently the clamping plate 24 to clamp a piece of work such as 26 between the clamping plate 24 and the table 22, as soon as the plate 24 contacts the upper face of the workpiece 26, further downward movement of the clamping plate 24 and consequently the post 28 will be prevented. At this point, of course, a relatively heavy pressure is applied to the handle or lever 48 to securely clamp the work in place as this pressure is applied to the shaft 42 attempting to cause further rotation thereof under such circumstances, such force or pressure in being transmitted from the teeth of the pinion 44 to the teeth of the rack 46 will, because of the angularity of the teeth of the pinion and rack, set up a component of force axially of the shaft 42 tending to move such shaft axially thereof relative to the base 20, such force being directly proportional to the turning force applied to the shaft 42 and the proportional amount of such turning force exerted axially of the shaft depending upon the angle of the teeth of the pinion and rack with respect to the axis of the shaft 42. The amount of axial force in the shaft 42 occurring during normal raising and lowering movement of the clamping plate 24 and before any clamping force is actually applied to the work received by the fixture is relatively small because of the relatively small turning force necessarily applied to the shaft in so moving the clamping plate 24, a material axial force of the shaft 42 occurring under the above-described conditions only when a material resistance is offered to movement of the clamping plate 24 and/or post 28.

In accordance with the present invention advantage is taken of the axial force exerted on the shaft 42 upon the occurrence of a material resistance offered to vertical movement of the clamping plate 24 and post 28 as above described to provide a means for frictionally locking the shaft 42 against inadvertent rotation. This is simply accomplished by providing complementary frusto-conical surfaces fixed with respect to the shaft 42 and with respect to the base 20, such surfaces being arranged in concentric relation with respect to the shaft 42 and so disposed that the axial force applied to the shaft 42 when a clamping pressure is applied therethrough to a piece of work in the fixture draws such conical surfaces into frictional engagement with each other.

The above-described arrangement may be carried out in a number of different ways, but in the construction illustrated in Figs. 1 to 6 inclusive, the shaft 42 has formed on that end thereof adjacent the operating lever 48 a frusto-conical surface 52, the small end of such surface being disposed inwardly of the corresponding end of the shaft inasmuch as the angularity of the teeth on the pinions 44 and racks 46 is such as to tend to move the shaft 42 in such direction upon the occurrence of resistance tending to prevent downward movement of the clamping plate 24 during the corresponding rotational movement of the shaft 42.

The corresponding end of the corresponding bearing boss 40, which is shown formed integrally with the base 20, is formed with a complementary frusto-conical surface 52 so that when such resistance to rotation of the shaft 42 occurs through the clamping plate 24 engaging a piece of work such as 26 and resulting in a force set up axially in the shaft 42 tending to move it to the left as viewed in Fig. 1, the frusto-conical surface 52 is drawn into engagement with the surface 54 by a force, as above explained, proportional to the clamping force applied to the work 26, and thus the surfaces 52 and 54 are drawn into firm frictional engagement with each other.

It will be appreciated, of course, that regardless of the angularity of the frusto-conical surfaces 52 and 54, such frictional engagement will occur between them under the above-stated conditions, and that even where the surfaces 52 and 54 have an included angle of 180 degrees, that is where they lie in the surface of a plane, such frictional engagement will be set up and may be sufficient to lock the shaft 42 under such circumstances against such inadvertent rotation in a reverse direction as would release the clamping effect on the work. It will also be appreciated that the sharper the angle of the frusto-conical surfaces 52 and 54, the greater will be the frictional engagement between them, but it will also be appreciated that the angularity of these surfaces will preferably be greater than the angle of friction of the material from which they are formed so that they will not remain together in the absence of axial pressure tending to maintain their locked position. Preferably the angularity of the surfaces 52 and 54 is such as to approach but to be materially greater than the angle of friction of the material from which they are formed so as to obtain a maximum frictional locking effect between them upon the application of the above-described axial pressure on the shaft 42 during a clamping effect on work, and yet provide a construction that does not require the application of a force in the opposite direction to separate such surfaces and thus to provide one which will automatically release as soon as the axial pressure is released.

Accordingly, with the above-described construction it will be appreciated that in practice, a piece of work such as 26 is placed on the table 22 when the clamping plate 24 is in elevated position, and then the workman grasps the knob 50 of the operating lever 48 and turns the shaft 42 in a direction to lower the clamping plate 24. Under such circumstances, as soon as the clamping plate 24 comes in contact with the work 26 and the workman applies a material turning force on the shaft 42 through the handle or lever 48 and knob or ball 50, the clamping plate 24 will be drawn down firmly on the work 26 to clamp it to the table 22 and at the same time the operating shaft 42 will move or tend to move axially and will bring the frusto-conical surfaces 52 and 54 into intimate and frictionally locked relationship with respect to each other. This will maintain the shaft 42 in its then rotated position and through it maintain the clamping plate 24 in clamping relation with respect to the work 26 upon release of the turning force on the shaft 42, and will hold the shaft 42 against inadvertent rotation in the opposite direction. In actual practice it has been found that particularly where the knob 50 is made of sufficient size and mass, after the work 26 has been properly applied to the table 22, the workman may simply throw the knob 50 downwardly and the inertia of the same acting through the shaft 42 and posts 28 will be sufficient to firmly clamp the work 26 in position and to lock the shaft 42 against inadvertent rotation in a work loosening direction.

When the machining operation on the work 26 in the clamping fixture thus described has been completed, the workman simply grasps the knob 50 and rotates the shaft 42 in a direction opposite to that required for the clamping movement of the shaft 42 in the reverse direction immediately releasing the surfaces 52 and 54 from frictional engagement with each other, this being true not only because such initial movement has the effect of relieving the above-described axial force on the shaft 42, but due to the force transmitted between the pinions 44 and rack 46 necessary to lift the weight of the clamping plate 24 and post 28, actually reversing the direction of force acting through the shaft 42 to thus effect a separation of the surfaces 52 and 54.

In order to prevent the surfaces 52 and 54 from being separated from each other to an excessive degree during the last-mentioned movement of the shaft 42, the end of the shaft 42 opposite the cone 52 thereon is provided with an axial threaded bore therein in which a screw 60 is received and a washer 64 is interposed between the head of the screw and the corresponding end of the corresponding bearing boss 40, preferably with the interposition of a lock washer 62. As best brought out in Figs. 1 and 3 the washer 64 is sheared to provide a pair of radially-directed tongues 66 thereon having free inner ends which are inwardly bent as illustrated in Fig. 1 into a diametrical slot 68 formed in the corresponding end of the shaft 42 to thus lock the washer 64 against relative rotation with respect to the shaft 42. The relation of the parts is such that a slight axial movement of the shaft 42 is permitted but the shaft is restricted against an undue amount of axial movement thereby.

As best brought out in Fig. 1, in order to prevent the possibility of the shaft 42 being turned in a reverse direction to an extent which would permit inadvertent disengagement of the pinions 44 and racks 46, a washer 70 of slightly greater diameter than the diameter of the posts 28 is secured to the bottom end of each post 28 by means of a screw 72. The shaft 42 may, therefore, be turned to raise the posts 28 until the washers 70 strike the lower ends of the bosses 38 which thus limits further upward movement of the post 28 at a point where the pinions 44 and racks 46 still remain in meshing engagement with each other.

Preferably the posts 28 have a sufficiently free slidable engagement in the bosses 38 that they will drop under the force of gravity if not restricted, so that when the shaft 42 is turned to lower the clamping plate 24, no actual axial force on the shaft 42 will be set up tending to force the surfaces 52 and 54 in frictional engagement with each other until the clamping plate 24 contacts the work 26. On the other hand when the shaft 42 is turned to raise the clamping plate 24, it will be appreciated that there will be some axial force applied to the shaft 42 not only tending to separate the surfaces 52 and 54, but tending to bring the washer 64 into frictional engagement with the corresponding end of the corresponding bearing boss 40. However, the force applied to the shaft 42 under such circumstances is not sufficient to exert any material retarding force on the rotation of the shaft 42.

In some instances, and particularly for some types of work the clamping plates 24 may be of such size and configuration as to be relatively heavy and in fact of such mass that unless otherwise guarded against, pressure must be applied to the lever 48 to prevent it from moving under the force of gravity towards its lowermost position. Such condition is dangerous for the reason that a workman may get his fingers caught between the clamping plate and the work when the clamping plate 24 thus drops, unless extreme care is taken. In such cases the construction shown in Figs. 1 to 6 inclusive, may be readily modified to prevent the possibility of such occurrence, and the manner of accomplishing this is illustrated in Figs. 7 and 8. This is accomplished by removing the screws 60 and washers 62 and 64, and in place of such washers a block member 80 is applied to the corresponding end of the corresponding bearing boss 40. This block, as brought out in Fig. 8, has a straight lower edge 82, and the corresponding end of the table 22 is formed to provide a complementary straight shoulder 84 which is also brought out in Fig. 1. The inter-engagement of these shoulders prevents relative rotational movement of the block member 80 with respect to the base of the fixture. The block 80 is provided with an opening 86 therein concentric with the axis of the shaft 42, this surface being frusto-conical and tapering inwardly. A screw 88 replaces the screw 60 and in this case is of a greater length and receives thereon a frusto-conical member 90, the peripheral surface of which is complementary to the surface 86 of the block 80. The member 90 is provided with a pair of axial projections 92 thereon which interfit with the slot 68 in the corresponding end of the shaft 62 to thus hold the cone member 90 against relative rotation with respect to the shaft. The relation of the parts 80 and 90 is such that when the screw 88 is tightened up, the same limited amount of axial movement of the shaft 42 relative to the base, as in the first-described construction, is provided. With this construction when the clamping plate 24 is raised to release the work 26 between it and the table 22, the posts 28 are raised until the washers 70 contact the bottom ends of the bosses 38, and the application of a turning force to the shaft 42 is continued, with the result that due to the same angularity between the teeth of the pinions 44 and racks 46 that causes the locking action of the shaft to the base upon downward movement of the clamping plate 24, the shaft 42 has an axial force applied thereto which draws the cone member 90 into firm frictional engagement with the conical surface 86 of the block member 80 to thus frictionally lock the clamping plate 24 against inadvertent movement in its raised position. Thus the axial movement of the shaft 42 occurring when an appreciable turning force is applied thereto against resistance is utilized not only to lock the parts in their clamping relation, but also to lock the parts in their released relation and this in an extremely simple and economical manner.

It will be appreciated, of course, that coned surfaces equivalent to the surfaces 52 and 54 may be provided by modifying the construction thus far shown and described in a number of different ways. For instance, in the construction illustrated in Fig. 9, instead of using the coned surfaces 52 and 54 at one side of the fixture, these are eliminated, and the opposite end of the operating shaft, here illustrated at 42a, is formed with a frusto-conical end 100. The corresponding end of the corresponding bearing boss, here illustrated at 40a, is extended and internally formed to provide a complementary coned surface 102. The structure otherwise being identical to that first described, it will be appreciated that the frusto-conical surfaces 100 and 102 function in identically the same manner as the surfaces 52 and 54 of the first-described construction.

In Fig. 10, in which parts equivalent to the first-described construction are illustrated by equivalent numbers bearing the sub-letter "b," the conical surfaces are provided at the same end of the shaft 42b as in the first-described construction, but in this case that end of the bearing boss 40b in which the conical surface 54 is provided in the first-described construction is in this case formed to provide an external conical surface 110 concentric with the axis of the shaft 42b and in this case the member 112, fixed to the shaft 42b as by means of a key 114, is formed to present an internal frusto-conical surface 116 arranged for complementary engagement with the surface 110. The operating handle or lever 48b serves to limit outward movement of the member 112 on the shaft 42b and a nut 118 locks the operating handle 48b against outward displacement on the shaft 42b. It will be appreciated that this modified structure operates in substantially the same manner as the structure first described.

In Fig. 11 in which parts equivalent to the first-described construction are indicated by the same numerals bearing the sub-letter "c," the operating shaft 42c in this case has fixed to the right-hand end thereof, as viewed in Fig. 11 and which figure corresponds to the view in Fig. 1, a frusto-conical member 120, but in this case instead of tapering inwardly as in the first-described construction, the member 120 is tapered outwardly or to the right as viewed in Fig. 11. In order to provide a complementary cone surface such as 122 for the member 120, a separate member 124 is provided in this case and secured to the corresponding end of the base portion of the fixture by screws 126. In this case, in order to utilize the conical surfaces for locking the fixture in its clamped position, it is necessary that the hand of the teeth of the pinion 44c and the rack 46c be reversed from that shown in the preceding views so that when the final clamping pressure is applied to the shaft 42c an axial component of force is applied to the shaft 42c acting to the right as viewed in Fig. 11, instead of to the left as in the previously described constructions. Otherwise the construction is the same as in the first-described construction and functions in identically the same manner.

In Figs. 12 and 13 another modified form of construction is shown which is similar in many respects to the construction first described, and for that reason equivalent parts are indicated by the same numerals except that in Figs. 12 and 13 such numerals bear the sub-letter "d." Accordingly, only the differences between the two constructions need be specifically mentioned. The base 20d is substantially the same as the base 20 first described, except that the table 22d thereof is of slightly greater height and instead of employing a pair of bosses such as the bosses 40 first described for receiving the shaft 42, a single transverse boss 40d is provided for rotatably receiving the operating shaft 42d. The base 20d is also provided with a pair of laterally spaced vertically extending hollow bosses 38d corresponding to the bosses 38 first described and in each of which a post 28d, corresponding to the posts 28 first described, are vertically slidably received but in this case the posts 28d are positioned a sufficient distance forwardly of the operating shaft 42d as to be entirely out of contact therewith. Accordingly, the posts 28d simply serve as guides for the clamping plate 24d in its vertical movement relative to the table 22d and are not formed to provide racks thereon.

In order to raise and lower the clamping plate 24d, a third vertically extending boss 130 is provided on the base 20d midway between the bosses 38d and offset rearwardly therefrom. The boss 130 slidably receives therein a post 132 arranged with its axis parallel to the posts 28d. The upper end of the post 132 is reduced to the same diameter as the upper threaded ends of the post 28d so as to provide a shoulder abutting the lower face of the clamping plate 24d through which it projects, and a nut 32d, the same as the nuts 32d on the posts 28d, is threaded on the upper end of the same to hold it against relative axial movement with respect to the clamping plate 24d.

The surface of the post 132 is arranged in intersecting relationship with respect to the surface of the shaft 42d, and the shaft 42d is formed to provide a helical pinion 44d thereon at such point of intersection, and the post 132 is formed to provide a rack 46d in meshing engagement therewith. Thus in this case the posts 28d serve solely as guides in the movement of the clamping plate 24d, and although the post 132 also serves in the nature of a guide post, its primary purpose is that of providing a connection between the operating shaft 42d and the clamping plate 24d to effect raising and lowering movements thereof. Thus although a multiple post fixture is provided, only one of the posts is required to be machined to provide the rack 46d thereon, and only one pinion 44d is required to be provided on the operating shaft 42d. The structure may, therefore, be slightly more economical to build than the construction first described but without detracting from the rigidity of the same.

The operating shaft 42d is provided with a frusto-conical surface 52d thereon cooperating with a complementary frusto-conical opening 54d in the right-hand end of the boss 40d as viewed in Figs. 12 and 13, and in view of the fact that the pinion 44d and rack 46d are of the same general helical conformation as in the construction first described, operate to frictionally lock the fixture in clamped relation in substantially the same manner as the construction first described. One thing to be noted in connection with the construction illustrated in Figs. 12 and 13 is that the operating shaft 42d is made from a cylindrical piece of stock of a diameter equal to the maximum diameter of the frusto-conical surface 52d and that end thereof outwardly of the surface 52d is allowed to remain at its full diameter and is provided with a diametrical hole therethrough in which one end of the handle or lever member 48d is removably received and fixed against movement by means of a set screw 134 into the outer end of the operating shaft 42d.

The end of the boss 40d opposite that at which the frusto-conical surface 54d is located is formed directly to provide a frusto-conical surface 136 identical in size and shape to the surface 54d but simply reversed in direction therefrom. This is in lieu of providing a separate member such as the member 80 in the modification shown in Figs. 7 and 8. The corresponding end of the operating shaft 42d is reduced in diameter and threaded to provide a stud 42d' upon which concentric frusto-conical member 138 is received.

The cone member is prevented from relative rotation on the stud 42d by means of a diametrical key 140, of the same width as the stud 42d' and formed by straddle milling the end of the shaft 42d except for the width of the stud 42d'. The small end of the cone member 138 is diametrically slotted as at 141 for reception of the key 140. Clearance is provided between the outer end of the key 140 and bottom of the slot 141 so that any wear between the cone member 138 and the surface 136 will be automatically taken up. Lock nuts 142 threaded on the lefthand end of the operating shaft 42d together with a washer 144 serves to limit outward movement of the cone member 138 on the shaft 42d. In this construction the cone member 138 is provided with a counterbore 146 in its outer end within which is received a coil compression spring 147 surrounding the outer end of the operating shaft 42d and maintained under compression between the bottom of the recess and the washer 144 so as to constantly urge the cone member 138 inwardly into engagement with the frusto-conical surface 136. The spring 148 is relatively light and its only function is to constantly maintain the cone member 138 in contact with the surface 136 and so as to insure a small amount of friction being set up at this point at all times. The function of the cone member 138 is the same as that of the cone member 90 in connection with Figs. 7 and 8, that is to provide a friction lock between the operating shaft and the base 20d when any material resistance is exerted tending to prevent upward movement of the clamping plate 24d and to prevent inadvertent movement of the clamping plate 42d downwardly under the force of gravity. In other words, it is a safety feature designed to prevent the clamping plate 24d from dropping of its own accord and possibly catching the fingers of a workman between it and work being inserted into or removed from the fixture.

It will be noted particularly from an inspection of Fig. 12 that the large end of the cone member 138 has a cylindrical portion 148 formed thereon and that the outer end of the conical opening 136 is provided with a cylindrical bore portion 149 complementary thereto and in which the portion 148 is relatively closely received. The cone member 52d is similarly formed as illustrated in Fig. 13. This construction is preferably used for all the equivalent cone members shown in the various modifications and is for the purpose of forming a seal to prevent dust or dirt from entering between the cooperating coned surfaces. It will be appreciated that with this construction although the cone member 138 may withdraw axially from its cooperating cone socket portion 136 in the base the close clearance between the cylindrical end 148 and the cooperating surface 149 will remain constant and thus provide an effective seal.

In view of the fact that the frusto-conical surfaces 54d and 136 are identical to each other, and because of the fact that the pinion 44d is located midway between the opposite sides of the boss 40d, it will be appreciated that the operating shaft 42d may be assembled from either side of the fixture and that the cones 52d and 138 in being reversed therewith will operate in identically the same manner as above described. By this means the shaft 42d may be reversed with the handle 48d and thus permits the fixture to be used as either a righthand or lefthand fixture as may be desired in any case.

There may be instances where it is desired to introduce a yielding element between the operating shaft and the clamping plate of a clamping fixture such as any one of the structures above described. This is particularly so where the work to be operated upon is a casting having a relatively rough surface gripped between the clamping plate and the table, as in such case the pressure may be exerted against a small number of relatively rough points on the work which may break down during the machining operation. Under such circumstances if the clamping plate is not capable of following downwardly to take up the clearance which would otherwise be established by breaking down of the rough point, the work may become loosened in the fixture. Such yieldability may be introduced between the operating shaft and the clamping plate in the manner illustrated in Fig. 14, and may be applied to any of the constructions above described by replacing the nut 32 at the upper ends of the posts 28 by the same. In the construction illustrated in Figs. 12 and 13 it may be employed to replace the nut 32d on the central post 132, to obtain the same results.

In Fig. 14 the clamping plate is illustrated at 24e and may be identical to any of the clamping plates heretofore described. The post 28e as above described may be the same as any of the posts 28 previously described in Figs. 1 to 11, inclusive, or may be the post 132 described in connection with Figs. 12 and 13. In place of the nut 32 or its equivalent which is removed in such case a relatively long sleeve-like nut 150 is threaded onto the upper end of the post 28e in its place. Before threading on the nut 150 a sleeve 152 having an inturned lower end 154 is slipped over the upper end of the post 28e, followed by a coil compression spring 156 within which the nut 150 is projected. The nut 150 adjacent its upper end is provided with an annular radially outwardly directed flange 158 which is axially slidably received within the open upper end of the sleeve 152 and in threading the nut 150 downwardly on the post 28e the spring 156 is compressed between the flange 158 and the flange 154 of the sleeve 152, thus acting to urge the clamping plate 24e downwardly on the post 28e against its cooperating shoulders on the post. To lock the nut 150 against movement on the post 28e, a clamping plug 160 is threaded downwardly into the bore of the nut 150 and into binding engagement with the upper end of the post 28e.

With the above described construction it will be appreciated that when the operating handle or lever 48 is operated to force the clamping plate 24e downwardly against a piece of work, if sufficient force is applied it will cause the spring 156 to be compressed, the clamping plate 24e will move upwardly on the post 28e away from the cooperating shoulder on such post, and the clamping force on the work will in reality be taken through the spring 156. This spring is relatively heavy and, of course, designed to exert a sufficient amount of clamping force on the work through it to hold the work in position in the fixture. Assuming that a piece of work is clamped in the fixture through the spring 156 and the spring 156 has been compressed a material extent during the clamping operation, it will be appreciated that if any rough points on the work should break off during the machining operation the force of the spring 156 will automatically cause the clamping plate 44 to move downwardly to compensate for such points that are broken off and so as to maintain a required amount of clamping force on the work regardless of such occurrence. It will also be appreciated that where such a resilient element is desired in any fixture of the type described the only change in the fixture is replacement of the nut or nuts at the upper end of the posts 28 in the constructions shown in Figs. 1 to 11 and the post 132 in Figs. 12 and 13, by the structure illustrated in Fig. 14 to obtain the desired result.

The method of securing a handle or lever 48d to the operating shaft 42d in Figs. 12 and 13 is perhaps more desirable than the construction shown in the preceding views for the reason that it permits substitution of different types of handles with greater ease than with the construction first described. For instance, there may be some cases where it is desirable to employ a long operating handle or lever only during a clamping or an unclamping operation and to provide no handle at all or only a short piece of a handle during a machining operation. In such case a construction such as illustrated in Fig. 15 may be resorted to.

Referring to Fig. 15 it will be noted that instead of employing a long handle such as 48d in Figs. 12 and 13, such handle is replaced by a relatively short bar 164 having a tapered or frusto-conical end portion 166 projecting from the operating shaft 42d. In this case a relatively long handle or lever member 168 which is provided with a socket 170 in one end thereof complementary to the end 166 is removably received on the end 166. The handle or lever 168 may thus be applied to or removed from the end 166 as the occasion may demand.

Another form of handle construction is illustrated in Fig. 16 for use in substantially the same instances as the construction shown in Fig. 15 is used in. In this case instead of an elongated handle or lever member such as 48d, a relatively short pin 172 is inserted in the end of the operating shaft 42d and secured in place by the set screw 134 with its opposite ends projecting a short distance radially beyond the outer surface of the operating shaft 42d. An end wrench 174 having a socket end 176 of a size to receive the outer end of the operating shaft 42d therein is provided in this case, and the socket end 176 is provided with a plurality of diametrically opposed sets of slots 178 extending axially of the open end thereof, the slots 178 being of a sufficient width to receive the projecting ends of the pins 172 therein. The wrench 174 is provided with a cross-handle 180 for the purpose of enabling it to be manually turned. It will be appreciated that in this case the pin 172 projects a minimum distance radially outwardly from the corresponding end of the operating shaft 42d and the wrench 174 may be applied to it in any one of a plurality of angular positions for the purpose of turning the shaft 42d and may be readily removed as soon as the clamping fixture is either positioned in clamped or unclamped position. This last form of construction is particularly desirable for use where such clamping fixtures are mounted on a rotating table of a machine tool for different operations at different angular positions of the same.

In all of the constructions thus far described the helical pinion or pinions have been shown and described as being fixed with respect to the operating shaft and the shiftable frusto-conical member formed as a fixed part of the operating shaft. While this may be preferable in most instances as constituting the most economical way of obtaining the desired result, it is not at all essential. For instance, and as illustrated in Fig. 17, the conical surface is formed as part of the pinion, and although the pinion in such case may be either fixed to or movable axially of the operating shaft, as a matter of illustration it is shown mounted for relative axial movement on the operating shaft and movement of the pinion rather than the shaft is relied upon to effect the frictional locking feature of the fixture.

In Fig. 17 parts equivalent to the construction previously described are indicated by the same numerals except that such numbers bear the subletter "f." The post 28f in Fig. 17 is equivalent to the posts 28 previously described and is formed to provide a rack 46f thereon corresponding to the rack 46 previously described. In this case the operating shaft 42f is simply a cylindrical member to one end of which an operating handle 190 is non-rotatably secured by means of a key 192 and nut 194. The helical pinion 44f, instead of being formed integrally with the shaft 42f as in the previously described constructions is, in this case, formed separately and is secured on the shaft 42f for relative axial movement with respect thereto, but against relative rotation with respect thereto by means of a key 196. One end of the pinion 44f is extended and is formed to provide a frusto-conical surface 198 thereon concentric with the axis of the shaft 42f. The cooperating boss 40f is internally formed to provide a complementary frusto-conical surface 200. Movement of the pinion 44f away from the surface 200 is limited by means of a collar 202 fixed to the shaft 42f by means of a pin 204. With this construction it will be appreciated that when a clamping force is exerted through the handle or lever 190 on the operating shaft 42f, such force is transmitted through the pinion 44f to the rack 46f and when such force is built up due to the clamping effect of the fixture on a piece of work, then the reaction between the teeth of the pinion 44f and rack 46f tends to shift the pinion 44f to the left as viewed in Fig. 17 and force the frusto-conical end 198 of the pinion into frictional locking engagement with the frusto-conical surface 200 formed in the boss 40f of the base, thus resulting in identically the same locking effect as in the constructions previously described.

Having thus described my invention, what I claim by Letters Patent is:

1. In a clamping fixture of the class wherein there is a base, a clamping member is guided for movement toward and from said base and adapted to clamp a piece of work between it and said base, a rack part is secured to said clamping member through which movement of said clamping member toward and from said base is effected, a pinion part is provided in meshing relation with respect to said rack part for effecting movement of said rack part in a clamping direction, an operating shaft part is drivingly connected to said pinion part for effecting rotation thereof, and a handle part is drivingly connected to said shaft part for effecting rotation of said shaft part, the combination with said base and two of said parts of a connection between said two of said parts including co-operating surfaces operative upon the transmission of a material force to said clamping member tending to move it relative to said base to shift one of said two parts laterally of the direction of movement thereof required to effect movement of said clamping member relative to said base, a pair of co-operating friction surfaces one fixed relative to said base and one shiftable laterally upon lateral shifting of said one of said two parts engageable with each other under the influence of a clamping force transmitted between said handle part and said clamping member to frictionally lock said clamping member against inadvertent movement away from said base, and a second pair of co-operating friction surfaces one fixed relative to said base and one shiftable laterally upon lateral shifting of said one of said two parts engageable with each other under the influence of a force exerted between said two of said parts in a direction opposite to the direction of said clamping force exerted therebetween to frictionally lock said clamping member against inadvertent movement toward said base.

2. In a clamping fixture of the class wherein there is a base, a clamping member is movable toward and from said base, a post is secured to said clamping member and axially slidably received by said base, a shaft is rotatably mounted on said base transversely of said post, and means are provided in each instance for rotating said shaft, the combination with said base, post, and shaft of a part providing a friction surface fixed with respect to said base, a part providing a second friction surface complementary to the first mentioned friction surface connected to said shaft for receiving rotation therefrom, and means interconnecting said shaft and post for imparting axial movement to said post upon rotational movement of said shaft including means operable upon the presence of a material resistance to movement of said post in one direction through rotation of said shaft to cause said frictional surfaces to be drawn into firm engagement with each other.

3. In a clamping fixture of the class wherein there is a base, a clamping member is movable toward and from said base, a post is secured to said clamping member and axially slidably received by said base, a shaft is rotatably mounted on said base transversely of said post, and means are provided in each instance for rotating said shaft, an axially shiftable pinion gear rotatable by said shaft, rack teeth on said post arranged in meshing relationship with said pinion gear whereby rotation of said shaft is accompanied by axial movement of said post, a part having a coned surface fixed with respect to said pinion gear for equal rotation therewith and for equal axial movement in at least one direction, said base having a part providing a frusto-conical surface complementary to the first mentioned frusto-conical surface, said pinion gear having helically arranged teeth thereon of such hand that upon the presence of a material pressure between said teeth and the teeth of said rack said pinion is caused to move axially to effect interengagement of said coned surface.

4. In a clamping fixture of the class wherein there is a base, a clamping member is arranged in co-operative relation with respect thereto, and means are provided in each instance for effecting relative movement between said clamping member and said base comprising a rack member fixed with respect to said clamping member, a pinion rotatably supported on said base in meshing relationship with respect to said rack member, and means for rotating said pinion, the combination with said base, pinion and rack member of helically arranged teeth on said pinion, angularly arranged teeth on said rack member in meshing engagement with said teeth of said pinion whereby a rotative force applied to said pinion tending to move said rack means against resistance tends to displace said pinion axially thereof, and complementary frictional surfaces one fixed with respect to said base and the other rotatably and axially movable with said pinion engageable with each other upon said axial shifting of said pinion to frictionally lock said pinion against inadvertent rotation with respect to said base.

5. In a clamping fixture of the class wherein a clamping member is movable toward and from a base, the combination with said clamping member and base of a post fixed to said clamping member and slidably received by said base, a helical pinion gear rotatably mounted on said base about an axis disposed transversely with respect to said post, said pinion gear being mounted for axial shifting movement, rack teeth fixed with respect to said post arranged in meshing relation with respect to said pinion gear, means for rotating said pinion gear, said base having a friction surface fixed with respect thereto, and a part secured to said pinion for movement in the direction of shifting movement therewith and arranged for frictional engagement with said friction surface on said base upon axial shifting of said pinion in a direction to effect engagement of said part and friction surface, the angularity of the teeth of said gear and rack being such as to effect axial movement of said pinion in said direction under the influence of a force exerted between said pinion gear and said rack teeth when a workpiece is clamped against said base by said clamping member.

6. In a clamping fixture of the class wherein there is a base, a clamping plate is relatively movable with respect thereto, a post is fixed to said clamping plate and slidably received by said post, and a shaft is rotatably mounted on said base with its axis disposed transversely to the length of said post, the combination with said base, post, and shaft of a helical pinion gear mounted on said shaft, rack teeth on said post in meshing engagement with said pinion gear, said pinion gear being axially shiftable under the influence of a force transmitted therethrough to said teeth on said post to move the latter against a resistance, said base having a frictional surface fixed with respect thereto in surrounding relation with respect to the axis of said shaft, and a complementary frictional surface movable with said pinion axially thereof into frictional locking engagement with the first mentioned frictional surface upon axial movement of said pinion in one direction, the angularity of the teeth of said gear and rack being such as to effect said axial movement of said gear under the influence of a force transmitted through them in the clamping of a workpiece against said base by said clamping plate.

7. In a clamping fixture of the class wherein there is a base, a clamping member is movable toward and from said base, a post is secured to said clamping member and slidably received by said base, and a shaft is rotatably mounted in said base in perpendicular relationship with respect to said post, the combination with said base, post, and shaft of a helical pinion fixed to said shaft, rack teeth on said post arranged for meshing relationship with respect to said pinion gear, said shaft having a limited amount of axial movement relative to said base, said shaft having a coned surface thereon, said base having a complementary coned surface thereon arranged for frictional locking engagement with said coned surface of said shaft upon axial movement thereof in one direction, and means for rotating said shaft, the angularity of the teeth of said pinion and rack being such as to effect said axial movement of said pinion under the influence of the force transmitted through them in the clamping of a workpiece against said base by said clamping member.

8. In a clamping fixture of the class wherein there is a base, a clamping member is movable toward and from said base, a post is secured to said clamping member and slidably associated with said base, and a shaft is rotatably mounted in said base in perpendicular relationship with respect to said post and having a limited amount of axial movement in said base, the combination with said base, post, and shaft of a spiral pinion gear fixed to said shaft, said post having a complementary rack thereon whereby rotation of said shaft acting through said pinion, rack and post effects movement of said clamping member toward and from said base, a cone member fixed concentrically with respect to said shaft, said base having a surface complementary to the conical surface of said cone member and arranged for frictional locking engagement therewith upon axial movement of said shaft in one direction under the influence of a clamping force exerted between said pinion and rack, a second cone element fixed with respect to said shaft and tapered axially of said shaft in a direction opposite to the taper of the first mentioned cone element, and said base having a complementary cone surface fixed with respect thereto complementary to said second cone element and adapted for frictional locking engagement therewith upon axial movement of said shaft in a direction opposite to the first mentioned axial movement thereof against a material resistance.

9. In a clamping fixture of the class wherein there is a base, a clamping member is movable toward and from said base, a plurality of posts are fixed with respect to said clamping member and slidably associated with said base, rack teeth are formed on said posts, a shaft is rotatably and axially mounted in said base, and a plurality of pinions are fixed with respect to said shaft and each arranged in meshing relation with respect to said rack teeth on the corresponding of said posts, the combination with said base, posts, shaft and pinions of a part having a coned surface concentric with the axis of said shaft fixed with respect thereto, a part having a coned surface complementary to the first mentioned frusto-conical surface fixed with respect to said base, and frictionally interengageable therewith upon axial movement of said shaft in one direction, at least one of said pinions having helically arranged teeth thereon and being axially shiftable relative to said base and the corresponding of said rack teeth on the corresponding of said posts being disposed at an angle to both the length and width of said posts for meshing relationship therewith, the angularity of the teeth of said one of said pinions and the angularity of said rack teeth being such as to effect said axial movement of said one of said pinions under the influence of the force transmitted through them in the clamping of a workpiece against said base by said clamping member.

10. In a clamping fixture of the class wherein there is a base, a clamping member is movable toward and from said base, a pair of posts are secured to said clamping member in parallel relation with respect to each other and slidably received by said base for guiding said clamping member in its movement with respect to said base, a third post is fixed to said clamping member in parallel relation with respect to the two first mentioned posts, and a shaft is rotatably mounted in said base, the combination with said base, shaft and third post of a helical pinion mounted on said shaft for receiving driving movement therefrom, complementary rack teeth formed on said third post in meshing relationship with respect to said pinion, means providing a friction surface shiftable axially of and with said shaft with respect to said base, a complementary friction surface fixed with respect to said base, means in the connection between said shaft and said third post operable to effect axial shifting movement of the first mentioned friction surface upon the transmission of a material force between said shaft and said third post whereby to effect frictional engagement of said frictional surfaces, and means for rotating said shaft.

ERNEST F. HOHWART.